(12) United States Patent
Baudisch et al.

(10) Patent No.: US 7,478,321 B2
(45) Date of Patent: Jan. 13, 2009

(54) SYSTEM AND METHOD FOR DYNAMICALLY PROCESSING DISPLAY INFORMATION TO COMBINE DISPLAY FOCUS AND CONTEXT INFORMATION IN SCREEN DISPLAYS

(75) Inventors: Patrick M. Baudisch, Seattle, WA (US); Bongshin Lee, College Park, MD (US)

(73) Assignee: Microsoft Corporation, Redmond, WA (US)

( * ) Notice: Subject to any disclaimer, the term of this patent is extended or adjusted under 35 U.S.C. 154(b) by 448 days.

(21) Appl. No.: 10/900,239

(22) Filed: Jul. 27, 2004

(65) Prior Publication Data
US 2005/0028108 A1 Feb. 3, 2005

Related U.S. Application Data

(60) Provisional application No. 60/490,705, filed on Jul. 28, 2003.

(51) Int. Cl.
*G06F 17/00* (2006.01)
(52) U.S. Cl. .................... 715/243; 715/273; 707/3; 345/428
(58) Field of Classification Search ............. 715/517, 715/526, 205, 243, 273, 277, 237; 345/582, 345/689, 428, 728; 707/3; 7/3
See application file for complete search history.

(56) References Cited

U.S. PATENT DOCUMENTS

| 5,634,062 | A | * | 5/1997 | Shimizu et al. | 715/501.1 |
| 5,754,873 | A | * | 5/1998 | Nolan | 715/235 |
| 5,801,702 | A | * | 9/1998 | Dolan et al. | 715/854 |
| 5,886,698 | A | * | 3/1999 | Sciammarella et al. | 715/769 |
| 2003/0004941 | A1 | * | 1/2003 | Yamada et al. | 707/3 |
| 2003/0135497 | A1 | * | 7/2003 | Mochizuki | 707/3 |
| 2004/0100510 | A1 | * | 5/2004 | Milic-Frayling et al. | 345/864 |

OTHER PUBLICATIONS

Examiners Automated Search Tools (hereinafter East), copyright 1999, pp. 1-6.*

* cited by examiner

*Primary Examiner*—Thu Huynh
(74) *Attorney, Agent, or Firm*—Amin, Turocy & Calvin, LLP (57) ABSTRACT

A system and method for processing a set of information in a screen display are provided. A set of information is obtained that includes a subset of information corresponding to search criteria. A central focus display section is defined that includes at least one element in the subset of information. One or more context sections including information not included in the central focus display are defined such that the information in the context sections is scaled to allow a substantial portion of the information to be displayed. The information in the central focus display section and context section can be dynamically updated.

37 Claims, 8 Drawing Sheets

*Fig.1.*

*PRIOR ART*

SYSTEM AND METHOD FOR DYNAMICALLY PROCESSING DISPLAY INFORMATION TO COMBINE DISPLAY FOCUS AND CONTEXT INFORMATION IN SCREEN DISPLAYS

CROSS-REFERENCE TO RELATED APPLICATION

This application claims the benefit of U.S. Provisional Application No. 60/490,705, entitled FISHNET, A FISHEYE WEB BROWSER, and filed on Jul. 28, 2003. U.S. Provisional Application No. 60/490,705 is incorporated by reference herein.

FIELD OF THE INVENTION

The present invention relates to computer software and displays, and in particular, to a system and method for dynamically generating central and compressed focus areas with search criteria within screen displays.

BACKGROUND OF THE INVENTION

Generally described, computers and communication networks can be utilized to disseminate a variety of information. In one typical embodiment, various computers can host information for access by various users via a communication network, such as the World Wide Web ("Web" or "WWW"). In such an embodiment, the information is embodied in a Web page that consists of text and/or images that individuals can browse via software applications on a computer connected to the communication network. As the amount of information provided via Web pages increases, users often utilize additional tools to help them select which Web pages may include relevant information.

One attempt to increase user assessment of information relevancy corresponds to searching tools that identify Web pages, or content within a Web page, that is related to a search criteria. Examples of searching tools include Web pages designed to initiate a search of Web pages on the Web and/or software applications resident on a client computer to provide a search of the Web or a search of a particular Web page loaded on the client computer.

In the simplest form, potentially relevant Web pages can be displayed to the user in their entirety. Although some search tools attempt to prioritize the listing of Web pages by relevancy, a user would have to browse portions of the Web page to determine whether the relevancy of the content. Additionally, users some times have to browse through large amounts of information to find the most relevant information on the Web page. In another embodiment, one or more terms/images within the Web page can be marked, or highlighted, to assist the user in determining the relevancy of the Web page and/or find the relevant portions of content within the Web page. For example, one or more terms in the Web page can be highlighted, bolded, increased in font size, or otherwise manipulated, if the terms correspond to the search criteria.

Figure 1:
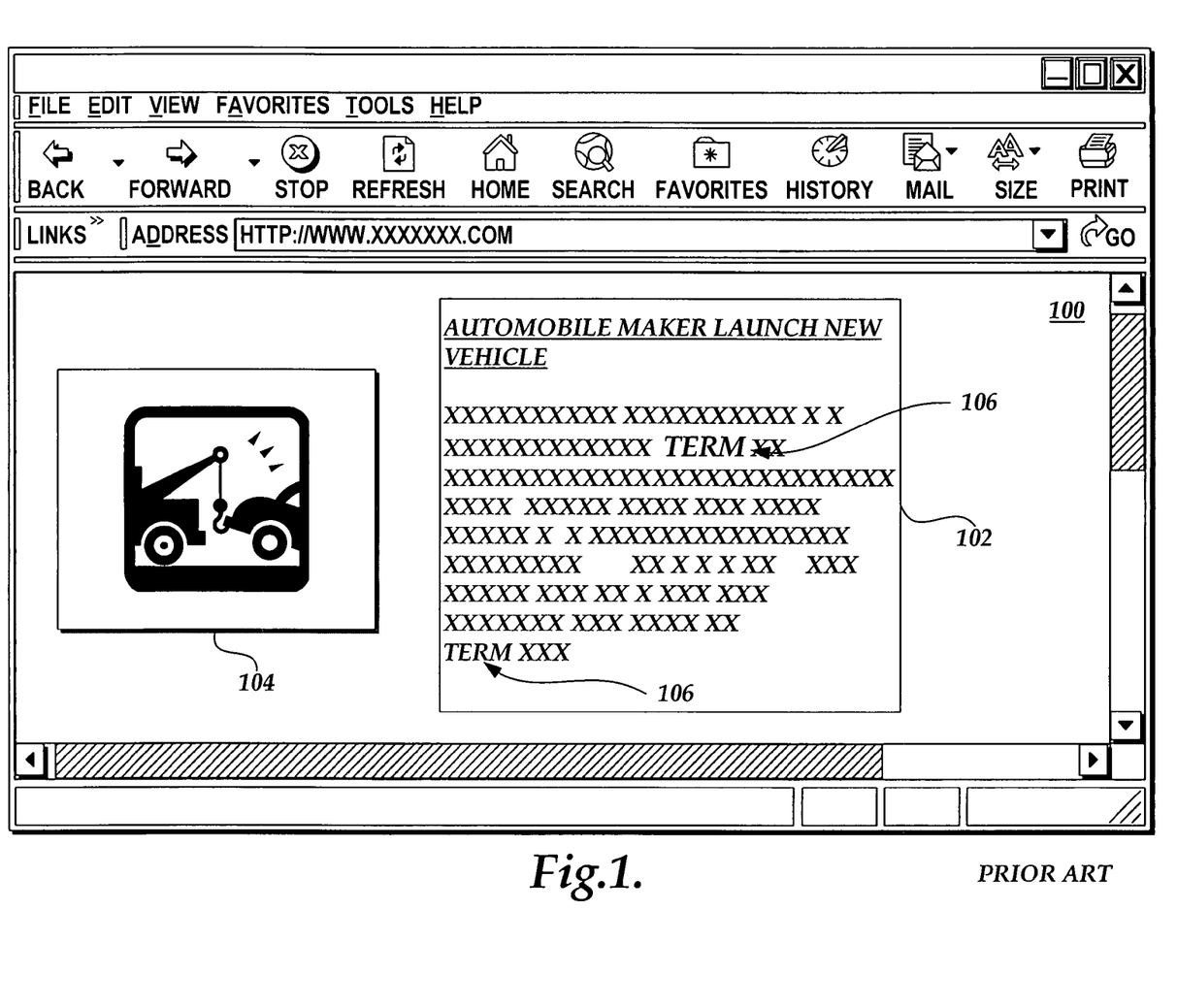
FIG. 1 is a block diagram illustrative of a screen display corresponding to a Web page having highlighted search criteria.

FIG. 1 is a block diagram illustrative of a screen display 100 corresponding to a Web page having highlighted search criteria. The screen display 100 can include various portions of information such as a text portion 102 and graphics portion 104. Additionally, the screen display 100 can include one or more highlighted terms 106 generated by a search tool for assisting the user in determining the relevancy of the content. Although highlighted search terms, such as the terms illustrated in FIG. 1, assist a user in assessing content relevancy and/or finding relevant portions of content, the benefit of highlighted information can decrease for Web pages that cannot be displayed in their entirety on a particular screen display. In such situations, users are typically required to manipulate software application controls that cause the screen display to "scroll" through the Web page in either a horizontal or vertical direction. In some instances, particular user computer screen displays can only display a limited amount of information in its intended format. In other instances, the amount of information provided by the Web page cannot be displayed in its entirety by most typical screen displays. Accordingly, users can have some difficulty in identifying all the relevant portions of a Web page that can lead to the user not reading and/or not identifying one or more potentially relevant portions. Additionally, users can also experience difficulty in assessing the relevancy of the Web page as a whole.

Thus, there is a need for a system and method for dynamically adjusting display information to assist users in processing relevancy information for display content.

SUMMARY OF THE INVENTION

A system and method for displaying a set of information in a screen display of a computer system are provided. As well known to those skilled in the art, in addition to the display, the computer system also comprises computer readable storage medium (memory) in a form of RAM, ROM, hard disk, for example, type of memory, and a processor that processes instructions stored in the computer readable storage medium. A set of information is obtained that includes a subset of information corresponding to search criteria. A central focus display section is defined that includes at least one element in the subset of information. One or more context sections including information not included in the central focus display are defined such that the information in the context sections is scaled to allow a substantial portion of the information to be displayed. The information in the central focus display section and context section can be dynamically updated.

In accordance with an aspect of the present invention, a method for processing a set of information is provided. In accordance with the method, a processing application obtains a set of information and identifies a subset of the set of information that corresponds to search criteria. The processing application defines a central focus display section such that at least a portion of one element in the subset of the information is included in the central focus display section. The processing application also defines a context display section including information not defined in the central focus area. The processing application then generates a screen display including the central focus display having a first scaling factor and a context display section having a second scale factor.

In accordance with another aspect of the present invention, a method for processing a set of information is provided. In accordance with the method, a processing application obtains obtaining a set of information. The set of information is arranged according to a vertical layout. The processing application identifies a subset of the set of information that corresponds to search criteria. The processing application defines a central focus display section such that at least a portion of one element in the subset of the information is included in the central focus display section. Additionally, the processing application defines a first context display section including any information not defined in the central focus area and having a layout position above the central focus display section and a second context display section including any information not defined in the central focus area and having a layout position below the central focus display section. The processing application generates a screen display including the central focus display and context display sections having a scale factor.

In accordance with a further aspect of the present invention, a method for processing a set of information is defined. A processing application obtains a set of information arranged according to a vertical layout. The processing application identifies a subset of the set of information that corresponds to search criteria. The processing application then dynamically defines a central focus display section and context display section such that at least a portion of one element in the subset of the information is included in the central focus display section. Additionally, the processing application generates a screen display including the central focus display and context display sections having a scale factor.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Generally described, the present invention relates to a system and method for dynamically processing display information. More specifically, the present invention relates to a system and method for dynamically generating a centralized focus area and compressed focus area in a screen display. Although the present invention will be described with regard to an illustrative screen display corresponding to a Web page, one skilled in the relevant art will appreciate that the screen display and screen attributes are illustrative in a nature and should not be construed as limiting. Further, although the present invention will be described with a regard to an illustrative computer display, one skilled in the relevant art will appreciate that the present invention may be applicable with any number of computing devices having a user interface, including, but not limited to, mobile telephones, mobile computer devices, portable digital assistants, consumer electronics and appliances, and the like.

In accordance with an illustrative embodiment, the present invention facilitates the display of a substantial portion of a set of information that includes the identification of portions of the information relevant to search criteria. The set of information can correspond to a text and/or images in a Web page, electronic documents, directories, or any additional information that can be provided to a user via a screen interface. As described above, the identification of portions of the set of information relevant to search criteria may be facilitated through a Web page search tool provided by the Web (e.g., a search engine Web page), a searching tool resident on a client computer (e.g., a toolbar resident on the client computer), and/or a search tool integrated as a function of a software application executed on the client computer or on a computer (e.g., a find function provided by a software application). In accordance with the present invention, the one more search tools may be utilized, alone or in combination, to identify terms/graphics that are relevant to search criteria. The present invention may be integrated with the search tool or interact as a stand-alone application.

Figure 2:
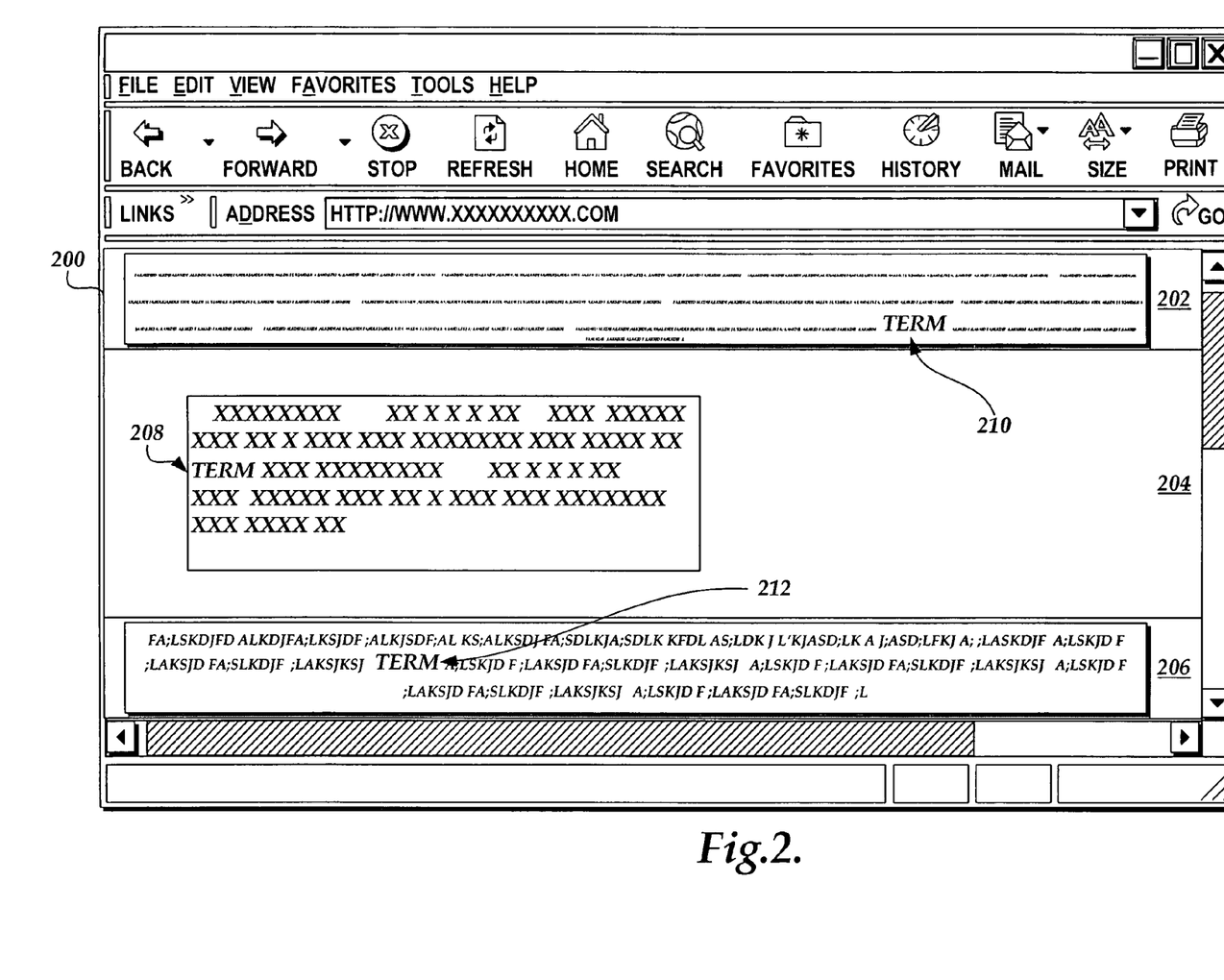
FIG. 2 is a block diagram illustrative of a screen display corresponding to a Web page having a central focus display area and two compressed display areas in accordance with the present invention.

With reference now to FIG. 2, an illustrative screen display 200 for dynamically adjusting display content will be described. As explained above, the present invention facilitates the display of a substantial portion, if not all, of a set of information that includes one or more pieces of information that have been identified as relevant to a search criteria. In an illustrative embodiment of the present invention, the set of information corresponds to a layout in which the information is sequentially organized in a vertical and/or horizontal direction. As illustrated in FIG. 2, the set of the information display in the screen display 200 is organized into three display sections. The first display section corresponds to a first compressed display portion 202 that includes display information that has been compressed for display. The second display section corresponds to a central focus display portion 204 that includes display information that includes display information that has a position below the first display section information and that has been selected as the central focus display section of the screen display. The third display section corresponds to a second compressed display portion 206 that includes display information that has a position below the second display section information and that has been compressed for display. Although the display sections in the screen display 200 are organized vertically, one skilled in the relevant art will appreciate that the display portions may be organized horizontally or that the screen display can also include horizontally organized display portions.

In an illustrative embodiment of the present invention, each of the display portions include at least a portion of one or more pieces of information, such as terms or graphics, that have been identified as relevant to search criteria. In the central focus display section 204, the relevant term 208 is displayed in a manner that facilitates the user recognition of the relevant information and adjacent terms/graphics. In an illustrative embodiment of the present invention, relevant term(s) in the central focus display section 204 may be displayed as originally configured in the target layout (e.g., font, layout, color, etc.). Additionally, relevant images in the central focus display section 204 may be displayed in their entirety, in a compressed format (e.g., thumbnail images), or as a partially compressed image.

In addition to the display of the relevant information in the central display section 204, additional relevant information can also be displayed in either of the two compressed display portions 202 and 206. In an illustrative embodiment of the present invention, the relevant information 210 and 212 is displayed in a manner that facilitates the recognition of the relevant information. However, the adjacent information is compressed in a manner that facilitates the inclusion of a substantial portion of the set of information in the screen display 200. As will be described in greater detail below, in an illustrative embodiment of the present invention, adjacent information is compressed in the direction of the ordering of the display portions (e.g., vertical compression for vertically arranged display portions). Alternatively, the adjacent information may be compressed in both a vertical and horizontal direction at equal or different compression ratios. As will also be explained in greater detail below, the rate of compression of the adjacent information in the two compressed display portions 202, 206 will depend on the size of the display portions and the amount of information to be included in each display portion and may not necessarily the same.

Figure 3:
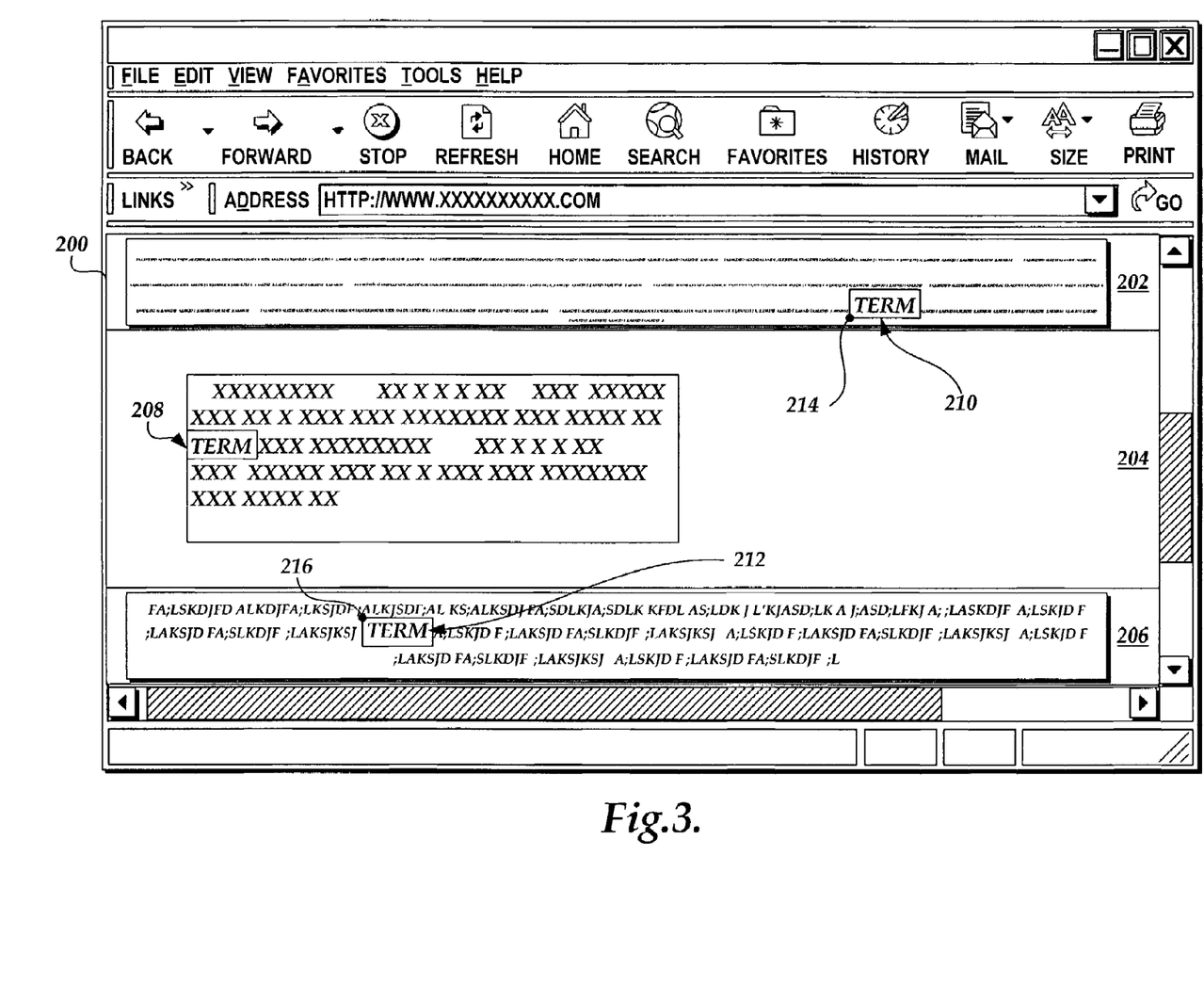
FIG. 3 is a block diagram of the screen display of FIG. 2 illustrating the addition of highlighting mechanisms for relevant information in the screen display.

With reference now to FIG. 3, the screen display 200 can include additional visual indicators to call attention to relevant information in each of the three display portions 202, 204 and 206. In an illustrative embodiment of the present invention, highlights are provided to the relevant terms 208, 210 and 212. The highlights can include borders, color changes and other visual indicators. For example, the highlight can include the modification of background for each pixel directly behind the relevant terms and a border adjacent to each relevant term. In an illustrative embodiment of the present invention, to prevent distortion of the highlighted sections with the two compressed display portions 202 and 206, the highlighted area is anchored to the corner most close to the beginning of the term and most close to the central focus area. As illustrated in FIG. 3, relevant term 210 is anchored at the lower left corner 214 and relevant term 212 is anchored at the upper left portion 216. One skilled in the relevant art will appreciate that additional graphics, such as animation, may also be incorporated within the present invention. Further, the highlights may be graphical icons that can be selected by a user to initiate a movement of the screen display 200, as will be explained in greater detail below.

Figure 4A:
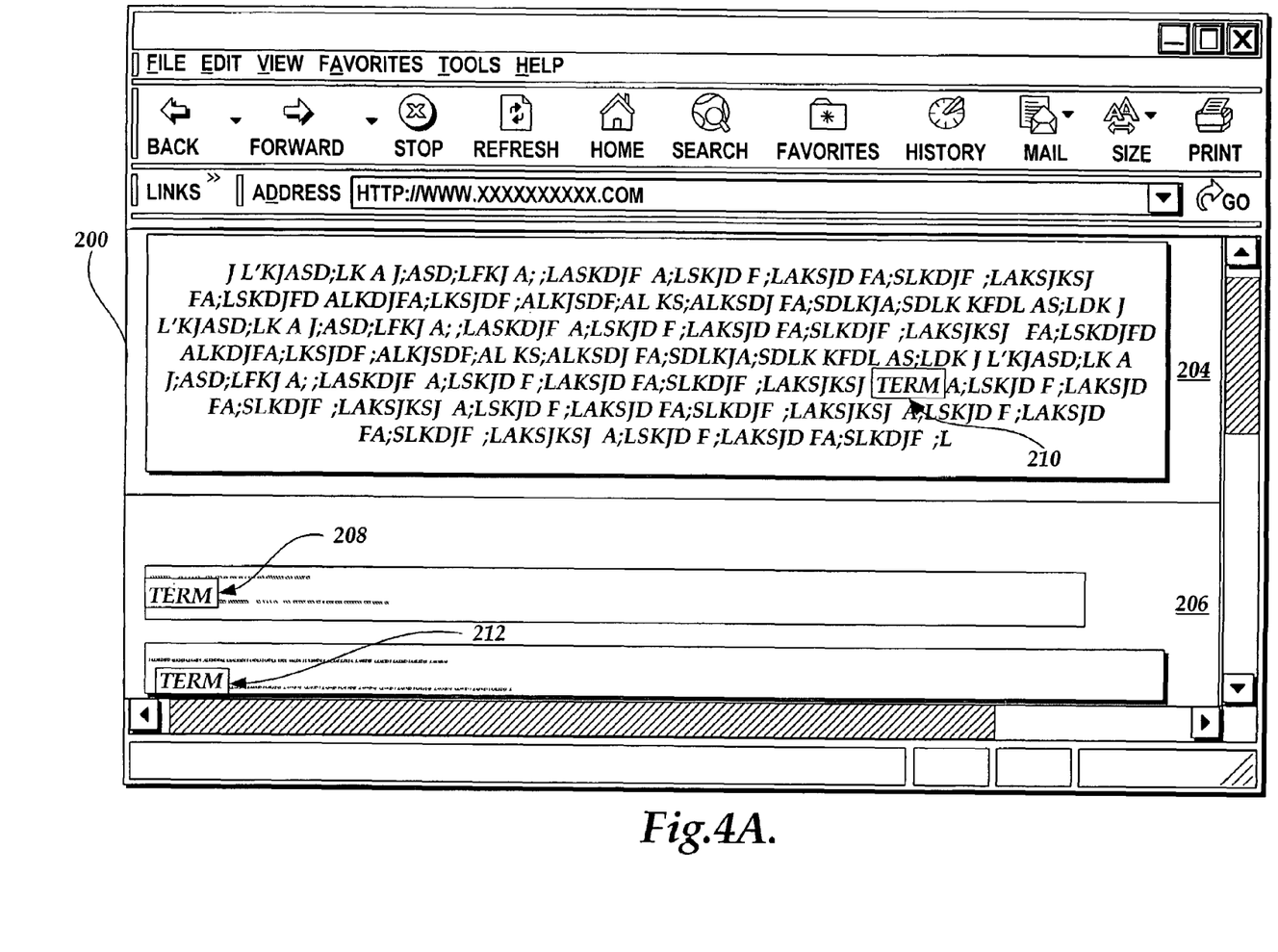
FIGS. 4A and 4B are block diagrams of the screen display of FIG. 3 illustrating the selection of various highlighted information in the screen display.
Figure 4B:
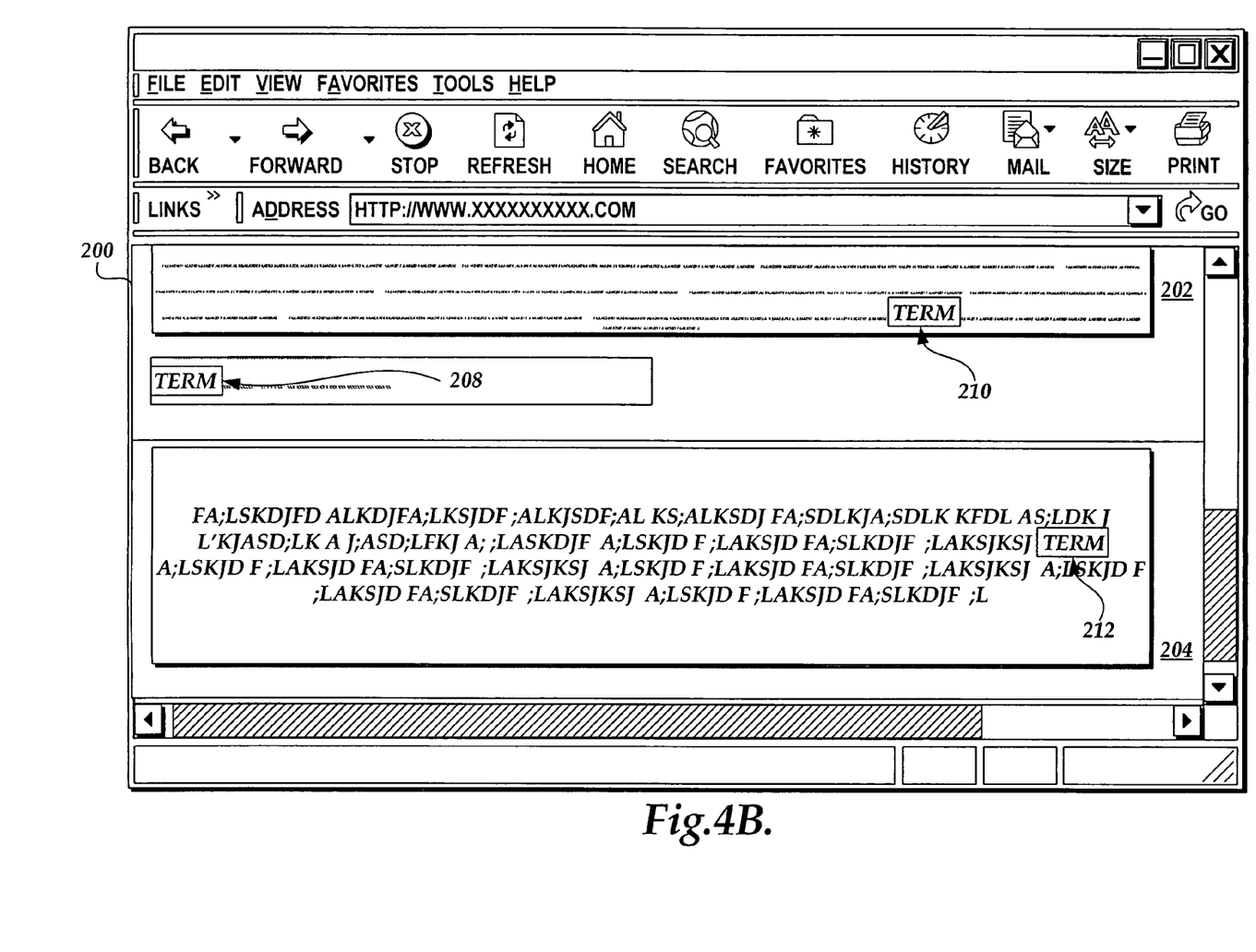

FIGS. 4A and 4B are block diagrams of portions of the screen display 200 illustrating the dynamic modification of the display portions 202, 204, 206 and the content within display portions according to user interaction. In an illustrative embodiment of the present invention, users can modify the central focus display portion 204 in a variety of ways. In one approach, users can manipulate traditional user interface controls, such as keyboard controls, mouse controls, user interface controls (e.g., scroll bars, page buttons, etc.), and the like, indicative of movement of the information on the screen display 200. In another approach, the highlighted terms 208-212 are selectable by the user to automatically adjust the screen display to focus on the selected highlighted term, such as with a single or double click of the mouse.

With reference to FIG. 4A, in the event a current highlighted term 210 is near the top of the set of information, the first compressed section 202 (FIG. 3) will be eliminated from the screen display 200. In this case, the previously compressed text adjacent to the current highlighted term will be displayed in the central focus display section 204 to facilitate user review. Additionally, the highlighted term 208 and adjacent information that was previously displayed in the central focus display section 204 (FIG. 3) has now been incorporated with the other information in the second compressed display section 206. In a similar manner and with reference to FIG. 4B, in the event a current highlighted term 212 is near the bottom of the set of information, the second compressed section 206 (FIG. 3) will be eliminated from the screen display 200. In this case, the previously compressed text adjacent to the current highlighted term will be displayed in the central focus display section 204 to facilitate user review. Additionally, the highlighted term 208 and adjacent information that was previously displayed in the central focus display section 204 (FIG. 3) has now been incorporated with the other information in the first compressed display section 202. Accordingly, the information included in the first and second compressed display sections 202 and 206 and the central focus display section 204 may be dynamically adjusted according to user interaction with the screen display 200.

Figure 5:
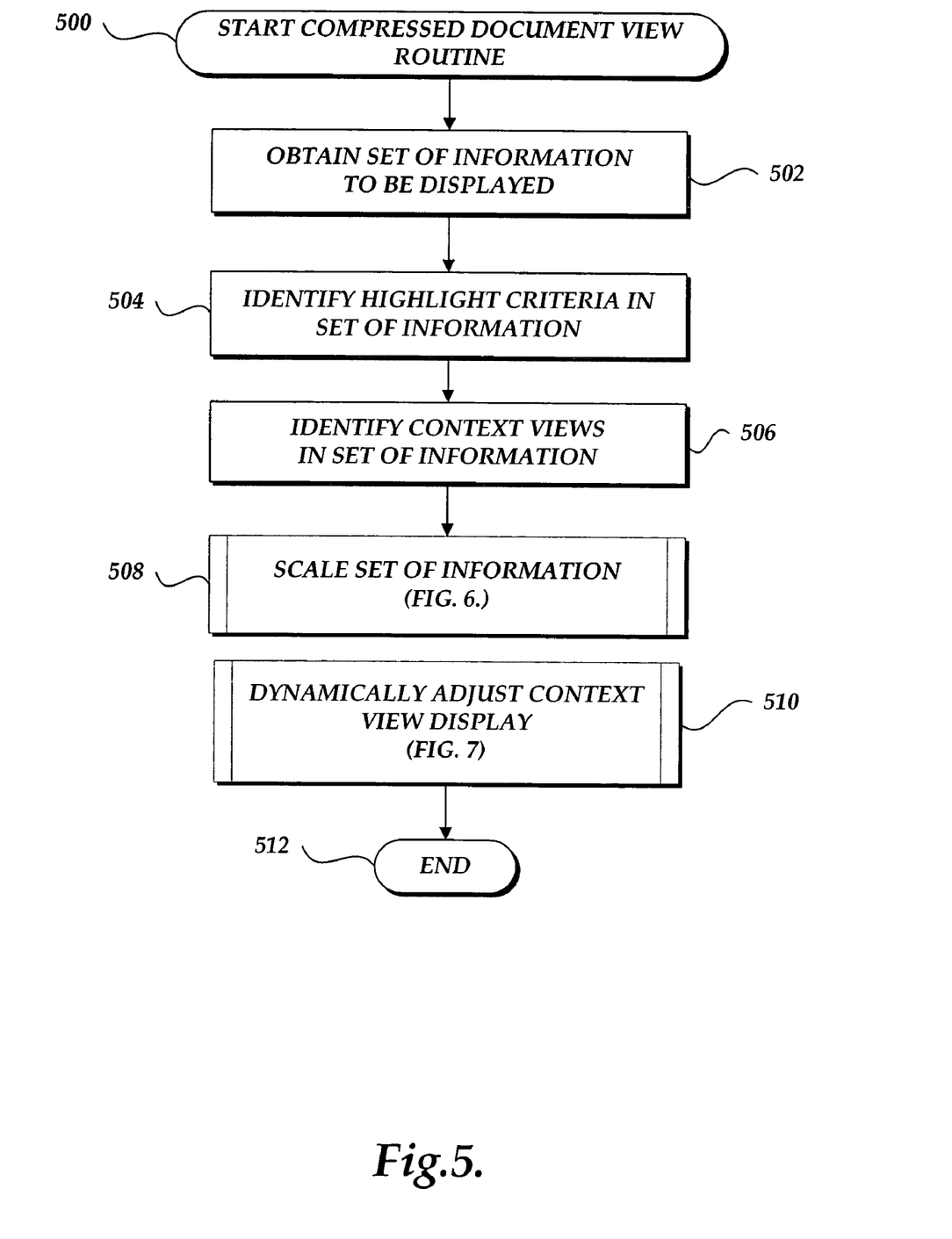
FIG. 5 is a flow diagram illustrative of a routine for generating a compressed document view in accordance with the present invention.

With reference now FIGS. 5-7, an illustrative routine 500 for dynamically processing a set of information on a screen display will be described. With reference to FIG. 5, routine 500 begins at block 502, by obtaining set of information, such as an electronic document, Web page, and the like, to be displayed in a compressed view. In an illustrative embodiment of the present invention, the set of information may be automatically obtained for processing when it is accessed by a client computer. Alternatively, the set of information may be selected based upon a user manipulation of a control.

At block 504, the set of information is processed to identify information corresponding to search criteria. In an illustrative embodiment, and as described above, the present invention may utilize any one of a variety of search tools to identify terms/graphics within the set of information relevant to a search criteria. The relevant information may be automatically generated based on search criteria, such as a user profile, document layout (e.g., heading information), or preselected search criteria. Alternatively, the relevant information may be manually generated by manipulation of a search tool. Additionally, the present invention may utilize multiple search tools to identify relevant subject matter and/or verify the relevance of subject matter. Although the present invention will be described with regard to relevant terms within a set of information, one skilled in the relevant art will appreciate that images, graphics and other types of information may be also be relevant to search criteria. At block 506, the one or more display sections of the set of information are identified. In an illustrative embodiment of the present invention, the central focus display section 204 may default to the first highlighted term in the set of information. Alternatively, additional criteria, such as some type of relevancy context, may be used to prioritize highlighted terms.

At block 508, the set of information is scaled for display. In an illustrative embodiment of the present invention, each section within the screen display may be scaled in manner to facilitate review of the central focus display section 204 while still present a substantial portion of the remaining portion of the information in the first and second compressed display sections 202, 206. The scaling of the display information will be described in greater detail below. At block 510, the routine 500 enters renders the current display information with the current context areas and enters a loop for dynamically adjusting the context areas. The dynamic modification of the context areas will be described below. At block 512, the routine 500 terminates.

Figure 6:
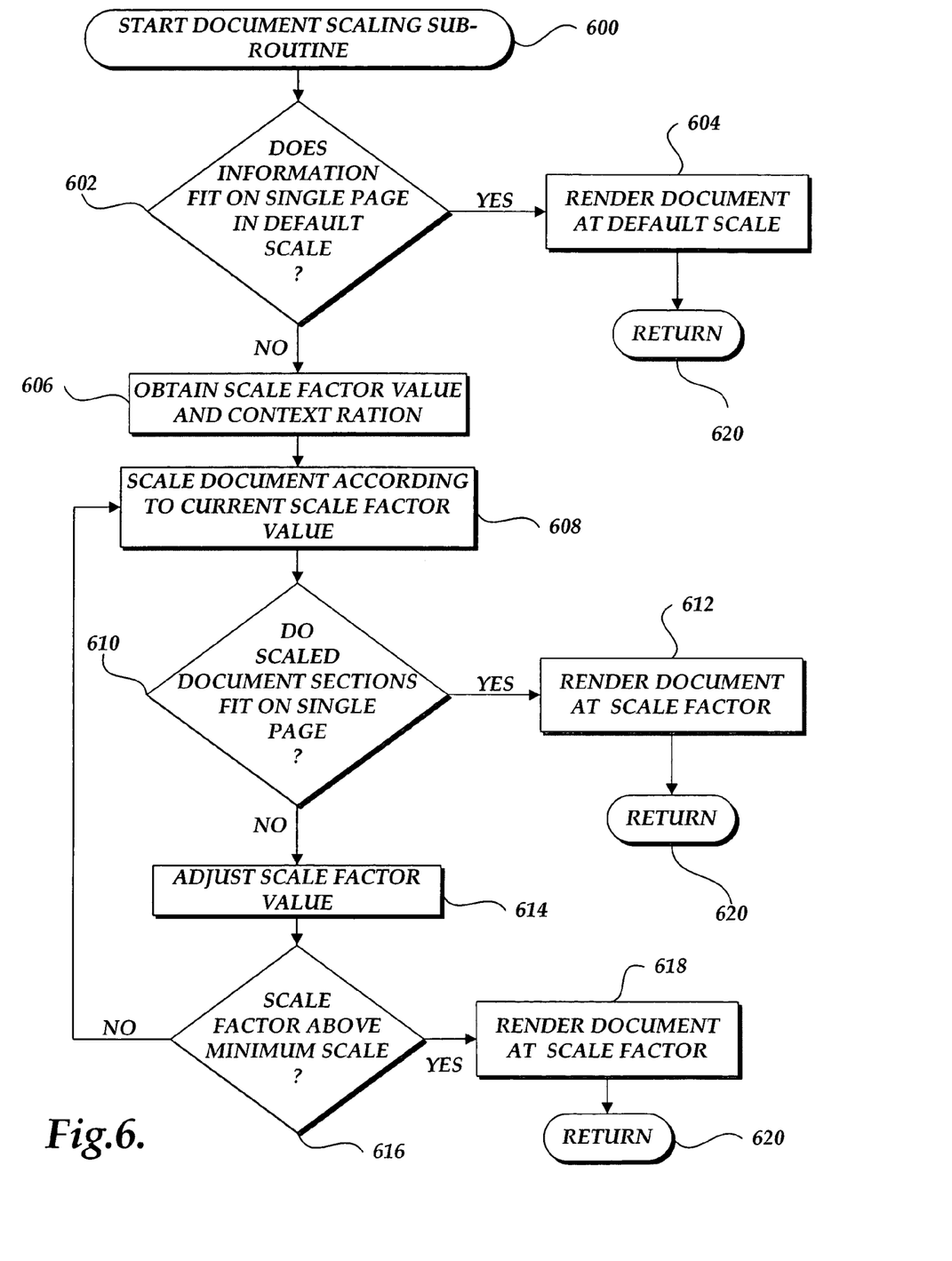
FIG. 6 is a flow diagram illustrative of a sub-routine for scaling portions of a display in accordance with the present invention.

With reference now to FIG. 6, a sub-routine 600 for scaling the central focus display section 204 and compressed display sections 202, 206 corresponding to block 508 (FIG. 5) will be described. At decision block 602, a test is conducted to determine whether the set of information (e.g., a Web page, electronic document, etc.) will fit within the defined space of the screen display 200. In an illustrative embodiment of the present invention, the set of information will have a defined layout to be rendered on the screen display of a client computer. The defined layout can correspond to predefined layout information included with the set of information (e.g., meta data), layout preferences associated with the software application rendering the set of information and/or layout preferences associated with the user accessing the client information. The layout information may also correspond to the size of the screen display 200 on one or more available computer displays associated with client computer. If the set of information may be displayed on the screen display at its default scale, at block 604, the set of information is rendered according to the default scale and sub-routine 600 returns at block 620.

If the set of information cannot be rendered at the default scale, at block 606, a scale factor value and a context area ratio are obtained. The scale factor value corresponds to a level of compression for the compressed areas. In an illustrative embodiment of the present invention, the scale factor value can in a range from 0%-100%. However, the scale factor value may be limited to a sub-range of 25% to 50% for readability, with the maximum scale factor value as a default value. The context area ratio corresponds to the percentage of the screen display that will be used to display the compressed display area. In an illustrative embodiment of the present invention, the context area ratio can be specified in a range from 0%-100%, although the context area ratio may also be limited to a sub-range for readability. Further, in an illustrative embodiment of the present invention, the central focus display section 204 will be scaled at 100%. However, one skilled in the relevant art will appreciate that the central focus display section 204 may also be scaled as well.

Equation 1 sets forth a formula for determining the height of the central focus display section 204 and the cumulative height of the compressed display sections 202, 206 as follows:

$$fh = \text{screen display height} * (1 - \text{context area ratio});$$

$$cah = (\text{information height} - fh) * \text{scale factor value}; \quad (1)$$

where
fh+cah<=screen display height
fh=focus area height
cah=context area height
screen display height=height of current screen display;
information height=height of set of information to be displayed.

Equation 2 sets forth a formula for determining the individual height of the compressed display sections 202, 206 as follows:

$$cah_{top} = (\text{screen display height} - (\text{information height} * \text{scale factor value})) / (1 - \text{scale factor value})$$

$$cah_{bottom} = \text{screen display height} - fh - cah_{top}. \quad (2)$$

At block 608, the context areas are scaled at the current scale factor value. In an illustrative embodiment of the present invention, the scaling of the data to be located in the first or second compressed display sections corresponds to a parallel projection in which the text/images may be scaled in a single direction. For example, the scaling of the text/images may only occur in the vertical direction. Alternatively, the text/images may also be scaled in multiple directions. At decision block 610, a test is conducted to determine whether the scaled set of information will fit within the defined space of the screen display 200. If scaled set of information may be displayed on the screen display at its default scale, at block 610, the set of information is rendered according to the current scale factor and sub-routine 600 returns at block 620. If the scaled set of information does not fit within the screen display, at block 614, the scale factor value is decreased. At decision block 616, a test is conducted to determine whether the current scale factor value is below a threshold. In an illustrative embodiment of the present invention, a threshold value for the scale factor value may be set to prevent scaling that would diminish readability. If the current scale factor value is below a threshold, at block 618, the set of information is rendered according to the current scale factor value (or the previous scale factor value) and sub-routine 600 returns at block 620. Alternatively, if the current scale factor is not below a threshold value, the sub-routine 600 returns to block 608 and scales the context areas according to the new current scale factor value.

Figure 7:
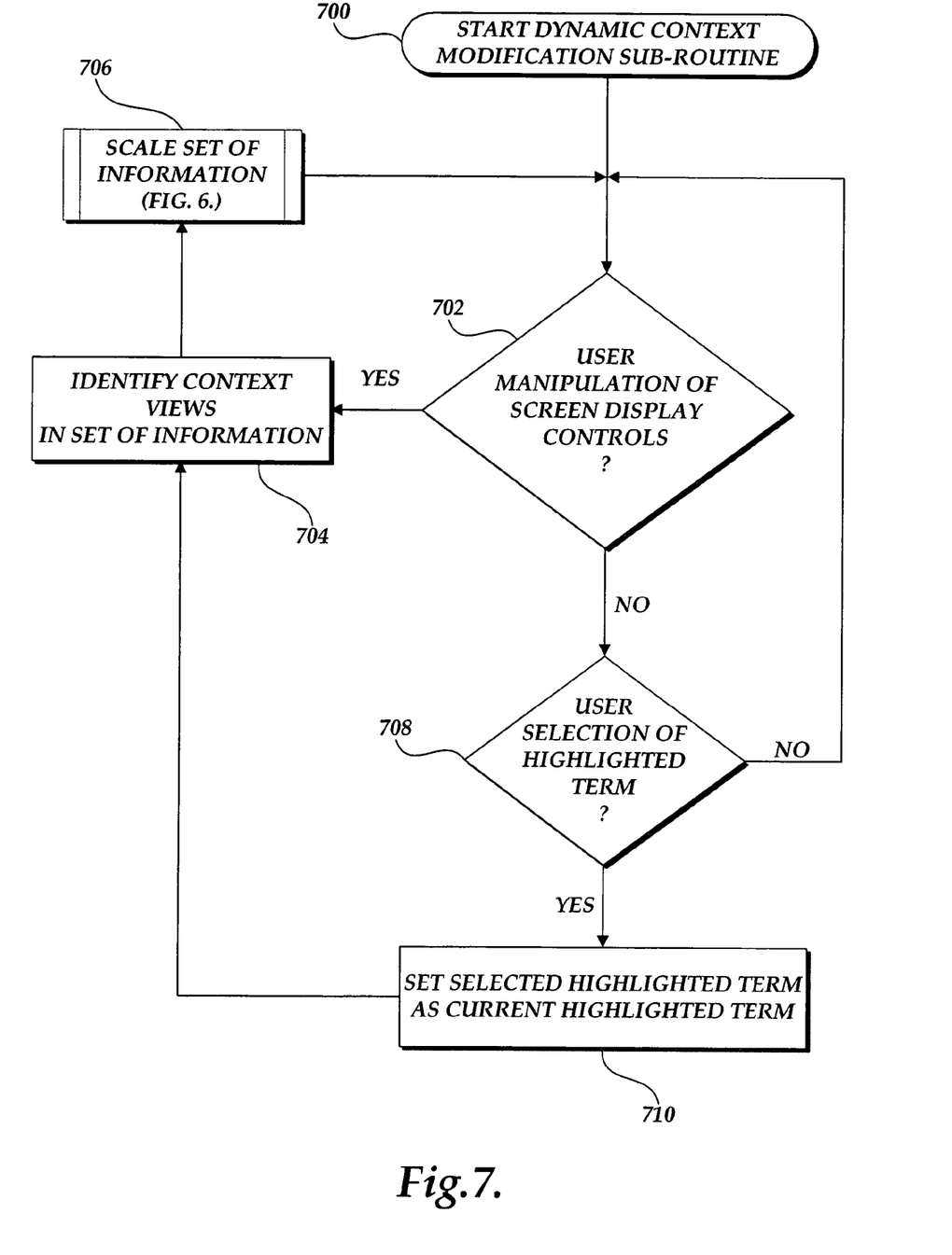
FIG. 7 is a flow diagram illustrative of a sub-routine for rendering a display having a central focus area and one or more compressed display area in accordance with the present invention.

With reference now to FIG. 7, a sub-routine 700 for dynamically adjusting the context areas, corresponding to block 510 (FIG. 5) will be described. At decision block 702, a test is conducted to determine whether there has been any user manipulation of screen display controls. In an illustrative embodiment of the present invention, the user may manipulate the screen display by utilizing keyboard controls, mouse controls or various user interface controls that cause the screen display to scroll in one of a variety of directions. Additionally, the user may manipulate the screen display by adjusting the attributes of the screen display, such as by resizing a graphical window corresponding to the screen display and/or moving to the screen display to a different computer display.

If there has been a user manipulation of the screen display controls, at block 704, new context views are identified with the highlighted criteria. In an illustrative embodiment of the present invention, the different context views may correspond directly to the addition/subtraction of information from the central focus display section and the compressed display sections. Alternatively, the different context views may correspond to an automatic jump to the next highlighted term. At block 706, the set of information is scaled for display. Similar to block 508, the set of information may be scaled in the manner described with regard to sub-routine 600 (FIG. 6).

If there has not been any user manipulation of the screen display controls at decision block 702, at decision block 708, a test is conducted to determine whether the user has selected a highlighted term for review. In an illustrative embodiment of the present invention, a user may select a highlighted term, such as by controlling a cursor with a mouse. The initial selection of a highlighted term may correspond to the generation of an additional highlight to the term. For example, the selected highlighted term may have identified by a red border. An additional manipulation of the term, such as a double click or a single click, provides an indication that the user wishes the selected highlighted term to be in the central focus display section 204. Accordingly, if the user has selected a highlighted term, the selected highlighted term is designated for the central focus display section and the sub-routine 600 returns to blocks 704 and 706. Alternatively, if a highlighted term has not been selected, the sub-routine 700 returns to decision block 702.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A method for processing a set of information, the method comprising:
 (a) obtaining a set of information;
 (b) identifying a subset of the set of information that corresponds to a search criteria, the subset including an element identified as relevant to the search criteria;
 (c) defining a central focus display section such that a portion of the subset of information containing the element identified as relevant to the search criteria is included in the central focus display section;

(d) defining a context display section such that the context display section includes another portion of the subset of information containing the element identified as relevant to the search criteria, said another portion not included in the central focus display section;

(e) generating a screen display including the central focus display section and a context display section, wherein the element included in the subset of information displayed in the central focus display section and in the subset of information displayed in the context display section is highlighted, and wherein at least one of the subset of the information displayed in the central focus display section and the subset of the information displayed in the context display section is compressed according to a predetermined scale factor; and (f) in response to a user selecting the highlighted element, in the context display section adjusting the screen display by:
  (i) eliminating the context display section, and
  (ii) displaying the subset of the information previously displayed in the context display section, in the central focus display section.

2. The method as recited in claim 1, wherein a layout of the set of information is arranged vertically, the method further comprising:
  defining a first context display section having information not defined in the central focus display section and having a layout location on the screen display above the central focus display section; and
  defining a second context display section having information not defined in the central focus display section and having a layout location on the screen display below the central focus display section.

3. The method as recited in claim 1, wherein the predetermined scale factor is 100%.

4. The method as recited in claim 1, wherein the predetermined scale factor-lies in the range from 25% to 50%.

5. The method as recited in claim 1 further comprising generating a highlight identifying each element of information in the subset of information corresponding to the search criteria.

6. The method as recited in claim 5, wherein the highlight is a border having a visual indicator.

7. The method as recited in claim 6, wherein an anchor for the border is based on a point most close to the central focus display section.

8. The method as recited in claim 5, wherein generating a highlight includes identifying the element of the subset of information that corresponds to the search criteria and automatically generating the highlight.

9. The method as recited in claim 1, wherein the set of information corresponds to a Web page.

10. The method as recited in claim 1 further comprising:
  obtaining a user manipulation of a screen display control;
  defining the central focus display section according to the user manipulation of the screen display control;
  defining the context display section according to the user manipulation of the screen display control; and
  generating a screen display including the central focus display section and a context display section, at least one of the display sections is compressed according to the predetermined scale factor.

11. The method as recited in claim 1, wherein defining the central focus display section and context display section includes:

obtaining a scale factor value and context ratio, the scale factor value corresponding to a level of compression for the compressed display section, and the context area ratio corresponding to a percentage of the screen display used to display the compressed display section; and adjusting the scale factor value and context ratio until a substantial portion of the set of information can be displayed on the screen display.

12. A computer-readable storage medium having computer-executable instructions performing the method recited in claim 1.

13. A computer system having a processor, a memory and computer executable instructions stored in the memory that executed by the processor, perform the method recited in claim 1.

14. A method for processing a set of information, the method comprising:
  (a) obtaining a set of information, wherein the set of information is arranged according to a vertical layout;
  (b) highlighting an element identified as relevant to the search criteria, the element included in a subset of the set of information, that corresponds to a search criteria;
  (c) defining a central focus display section such that a portion of the subset of information containing the element is included in the central focus display section;
  (d) defining a first context display section such that the first context display section includes another portion of the subset of information containing the element identified as relevant to the search criteria, said another portion not included in the central focus area and having a layout position above the central focus display section;
  (e) defining a second context display section such that the second context display section includes another portion in the subset of information containing the element identified as relevant to the search criteria, said another portion not included in the central focus area and having a layout position below the central focus display section;
  (f) generating a screen display including the central focus display and context display sections, wherein the element included in the subset of information displayed in the central focus display section, in the subset of information displayed in the first context display section and in the subset of information displayed in the second context display section is highlighted, and wherein at least one of the subset of the information displayed in the central focus display section and the subset of the information displayed in the context display section is compressed according to a predetermined scale factor; and
  (g) in response to a user selecting the highlighted element, in the first context display section adjusting the screen display by:
    (i) eliminating the first context display section,
    (ii) displaying the subset of the information previously displayed in the first context display section in the central focus display section, and
    (iii) incorporating the subset of the information previously displayed in the central focus display section into the second context display section.

15. The method as recited in claim 14, wherein the first and second context display sections include a subset of the set of information corresponding to search criteria.

16. The method as recited in claim 14, wherein the predetermined scale factor is selected from a range from 25% to 50%.

17. The method as recited in claim 14, wherein the highlight is a border having a visual indicator.

18. The method as recited in claim 17, wherein an anchor for the border is based on a point most closely to the central focus display section.

19. The method as recited in claim 14, wherein generating a highlight includes identifying the element identified as relevant to the search criteria in the subset of the set of information that corresponds to search criteria and automatically generating the highlight.

20. The method as recited in claim 14, wherein the set of information corresponds to a Web page.

21. The method as recited in claim 14 further comprising:
obtaining a user manipulation of a screen display control;
defining the central focus display section according to the user manipulation of the screen display control;
defining an updated context display section according to the user manipulation of the screen display control; and
generating a screen display including the central focus display section and a context display section, wherein at least one of the display sections is compressed according to the predetermined scale factor.

22. The method as recited in claim 14, wherein defining the central focus display section and the context display section includes:
obtaining a scale factor value and context ratio, the scale factor value corresponding to a level of compression for the compressed display section, and the context area ratio corresponding to a percentage of the screen display used to display the compressed display section; and
adjusting the scale factor value and context ratio until a substantial portion of the set of information can be displayed on the screen display.

23. A computer-readable storage medium having computer-executable instructions performing the method recited in claim 14.

24. A computer system having a processor, a memory and computer-executable instructions stored in the memory that executed by the processor, perform the method recited in claim 14.

25. A method for processing a set of information, the method comprising:
(a) obtaining a set of information, wherein the set of information is arranged according to a vertical layout;
(b) identifying a subset of the set of information that corresponds to search criteria, the subset including an element identified as relevant to the search criteria;
(c) dynamically defining a central focus display section and context display section such that a portion of the subset of information containing an element identified as relevant to the search criteria is included in the central focus display section and another portion in the subset of information containing an element identified as relevant to the search criteria is included in the context display section; and
(d) generating a screen display including the central focus display and context display sections, wherein the element included in the subset of information displayed in the central focus display section and in the subset of information displayed in the context display section is highlighted, and wherein at least one of the subset of the information displayed in the central focus display section and the subset of the information displayed in the context display section is compressed according to a predetermined scale factor; and (e) in response to a user selecting the highlighted element, in the context display section adjusting the screen display by:
  (i) eliminating the context display section, and
  (ii) displaying the subset of the information previously displayed in the context display section, in the central focus display section.

26. The method as recited in claim 25, wherein dynamically defining a central focus display section and context display section includes identifying a first context display section having information not defined in the central focus display section and having a layout location above the central focus display section; and
identifying a second context display section having information not defined in the central focus display section and having a layout location below the central focus display section.

27. The method as recited in claim 25, wherein the context display section includes a subset of the set of information corresponding to the search criteria.

28. The method as recited in claim 25, wherein the predetermined scale factor is 100%.

29. The method as recited in claim 25, wherein the predetermined scale factor lies in a range from 25% to 50%.

30. The method as recited in claim 25 further comprising generating a highlight identifying each piece of information in the subset of information corresponding to search criteria.

31. The method as recited in claim 30, wherein the highlight is a border having a visual indicator.

32. The method as recited in claim 31, wherein an anchor for the border is based on a point most closely located to the central focus display section.

33. The method as recited in claim 30, wherein generating a highlight includes identifying the subset of the set of information that corresponds to the search criteria and automatically generating the highlight.

34. The method as recited in claim 25, wherein the set of information corresponds to a Web page.

35. The method as recited in claim 25 further comprising:
obtaining a user manipulation of a screen display control;
dynamically updating the central focus display section and the context display section according to the user manipulation of the screen display control; and
generating a screen display including the dynamically updated central focus display and context display sections, wherein at least one of the dynamically updated display sections is compressed according to the predetermined scale factor.

36. The method as recited in claim 25, wherein dynamically defining the central focus display section and context display section includes:
obtaining a scale factor value and context ratio, the scale factor value corresponding to a level of compression for the compressed display section, and the context area ratio corresponding to a percentage of the screen display used to display the compressed display section; and
adjusting the scale factor value and context ratio until a substantial portion of the set of information can be displayed on the screen display.

37. A computer-readable storage medium having computer-executable instructions performing the method recited in claim 25.

* * * * *

UNITED STATES PATENT AND TRADEMARK OFFICE
CERTIFICATE OF CORRECTION

PATENT NO. : 7,478,321 B2  
APPLICATION NO. : 10/900239  
DATED : January 13, 2009  
INVENTOR(S) : Patrick M. Baudisch et al.

Page 1 of 1

It is certified that error appears in the above-identified patent and that said Letters Patent is hereby corrected as shown below:

In column 10, line 22, in Claim 14, delete "information," and insert -- information --, therefor.

Signed and Sealed this  
Nineteenth Day of April, 2011

David J. Kappos  
*Director of the United States Patent and Trademark Office*